United States Patent
McKee et al.

(10) Patent No.: US 6,177,525 B1
(45) Date of Patent: Jan. 23, 2001

(54) PROCESS FOR PREPARING MICROEMULSION POLYMER PARTICLES USING HIGH SHEAR FORCES

(75) Inventors: Graham Edmund McKee, Neustadt; Günter Renz, Freinsheim; Ekkehard Jahns, Weinheim; Walter Kastenhuber, Mannheim, all of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/242,467

(22) PCT Filed: Aug. 5, 1997

(86) PCT No.: PCT/EP97/04254

§ 371 Date: Feb. 17, 1999

§ 102(e) Date: Feb. 17, 1999

(87) PCT Pub. No.: WO98/07757

PCT Pub. Date: Feb. 26, 1998

(30) Foreign Application Priority Data

Aug. 21, 1996 (DE) .............................. 196 33 626

(51) Int. Cl.[7] .................. C08F 2/24; C08F 2/22
(52) U.S. Cl. .............. 526/87; 526/88; 526/201; 526/202; 524/458; 524/459
(58) Field of Search ................... 524/459, 458, 524/767; 526/87, 88, 201, 202

(56) References Cited

U.S. PATENT DOCUMENTS

| 3,615,972 | 10/1971 | Morehouse et al. |
| 4,071,670 | * 1/1978 | Vanzo et al. ........................... 526/88 |
| 4,245,070 | 1/1981 | Kemp . |
| 4,371,659 | 2/1983 | Druschke et al. |
| 5,679,735 | * 10/1997 | Geissler et al. ...................... 524/459 |
| 5,686,518 | * 11/1997 | Fontenot et al. ..................... 524/458 |

FOREIGN PATENT DOCUMENTS

| 44 43 886 | 6/1996 | (DE) . |
| 38 208 | 10/1981 | (EP) . |
| 443 609 | 8/1991 | (EP) . |
| 94/21699 | 9/1994 | (WO) . |

OTHER PUBLICATIONS

Jrl. Ap. Poly. Sci., vol. 50, 107–113 (1993).
Enc. Of Poly. Sci and Eng. vol. 16, 448–452 (1990).

* cited by examiner

Primary Examiner—David W. Wu
Assistant Examiner—Kelechi C. Egwim
(74) Attorney, Agent, or Firm—Keil & Weinkauf

(57) ABSTRACT

A particulate polymer P having an average particle diameter $d_{50}$ of from 0.1 to 50 $\mu$m is prepared by a process in which an emulsion E is prepared from
 one or more monomers M, which are polymerizable by free radical polymerization to give the polymer P,
 water, and
 at least one protective colloid PC by the action of high shear forces, and the emulsion E is subjected to polymerization in a reactor with the use of a free radical polymerization initiator RI wherein, based on the emulsion E, not more than 75% by weight of the emulsion E (initially taken portion of E) are initially taken in the reactor at the beginning of the polymerization and at least 25% by weight of the emulsion E (feed portion of E) are not fed to the reactor until after the beginning of the polymerization.

11 Claims, No Drawings

PROCESS FOR PREPARING MICROEMULSION POLYMER PARTICLES USING HIGH SHEAR FORCES

The present invention relates to a novel process for the preparation of a particulate polymer P having an average particle diameter $d_{50}$ of from 0.1 to 50 µm, in which an emulsion E is prepared from one or more monomers M, which are polymerizable by free radical polymerization to give the polymer P, water, and at least one protective colloid PC by the action of high shear forces, and the emulsion E is subjected to polymerization in a reactor with the use of a free radical polymerization initiator RI.

The present invention furthermore relates to special embodiments of the process as well as to particulate polymers P prepared by the process and the use of the polymers P as additives for thermoplastic molding materials or as toners for copiers.

Processes for the preparation of particulate polymers are, for example, emulsion polymerization and suspension polymerization. In emulsion polymerization, as a rule the monomers are emulsified in water and polymerized with the use of a polymerization initiator soluble in the aqueous phase and of an emulsifier, comparatively small polymer particles of, usually, from 30 to 1000 nm in diameter being formed. In suspension polymerization, the monomers are usually suspended in water with the use of a protective colloid which prevents the monomer droplets or polymer particles from aggregating and sticking together, and polymerization is carried out by means of an initiator which is soluble in the monomers, comparatively large particles of usually, from 50 to 500 µm in diameter being obtained.

A variant of suspension polymerization is microsuspension polymerization. Here, the mixture of monomers, water and protective colloid is exposed to high shear forces generated, for example, by very rapid and thorough stirring, resulting in monomer droplets—and from these polymer particles—their diameter of, usually, 0.1 to 50 µm is substantially smaller than in the case of the usual suspension polymerization.

A process of this type for the microsuspension polymerization of styrene divinylbenzene mixtures is described, for example, by L. Danicher et al. in Reactive Polymers 20 (1993), p. 111–121, and that for the microsuspension polymerization of styrene-n-butyl acrylate mixtures is described by M. Kamiyama in Journal of Applied Polymer Science, 50 (1993), p. 107–113.

German Patent, 2,618,761 discloses such a process for the polymerization of vinyl chloride.

EP-B 38 208 describes a corresponding process for the preparation of (pigment-containing) copier toner particles from a vinyl monomer.

EP-B 443 609 and U.S Pat. No. 4,071,670 disclose a microsuspension process for the polymerization of vinyl monomers with the use of a special high-speed stirrer.

Common to all these processes is that the total amount of the monomer emulsion is first initially taken in a stirred kettle reactor and early thereafter the polymerization is begun. The polymerization is accordingly carried out by a batchwise procedure.

In this procedure, controlling the temperature during the reaction presents problems since—particularly in the case of stirred kettles of relatively large volume—the heat of reaction evolved as a result of the exothermic polymerization can be removed only to an insufficient extent. In spite of stirring of the reaction mixture, hot spots may form in the kettle, leading to a nonuniform degree of crosslinking of the polymer particles and a nonuniform molecular weight distribution of the resulting polymer, ie. to undesired fluctuations in the product properties.

This problem cannot always be overcome, even when the kettle is equipped with—large-dimensioned and therefore expensive—cooling apparatuses, for example heat exchangers.

Moreover, the poorly controllable heat removal may result in the polymerization reaction going out of control (runaway of the reactor), which constitutes a considerable safety risk.

It is an object of the present invention to provide a process which does not have the disadvantages described. In particular, it is intended to provide a process which permits the preparation of a particulate polymer P of constant product quality.

It is a further object of the present invention to provide a technically simple and therefore economically advantageous process for the preparation of polymers P.

It is a further object of the present invention to provide a process which permits a particularly safe polymerization procedure.

We have found that this object is achieved by the process defined at the outset, wherein, based on the emulsion E, not more than 35% by weight of the emulsion E (referred to hereinafter as initially taken portion of E) are initially taken in the reactor at the beginning of the polymerization and at least 65% by weight of the emulsion E (referred to hereinafter as feed portion of E) are not fed to the reactor until after the beginning of the polymerization.

We have also found preferred embodiments for the process with regard to the period of addition of the feed portion and the type of monomers and protective colloids used.

Further preferred embodiments found relate to the addition of additives, the addition and polymerization of further monomers M*, the type of monomers M* and finally the particulate polymers P prepared by the process and their use as additives for thermoplastic molding materials or as toners for copiers.

The novel process and the preferred embodiments are described in more detail below.

Suitable as monomers M are all monomers, which are capable of free radical polymerization, ie. polymerize in the presence of free radicals. Preferred monomers M1) to M9) are the following:

M1) $C_1$–$C_{12}$-alkyl esters of acrylic acid or of methacrylic acid

Particularly suitable alkyl acrylates are those which are derived from ethanol, from 2-ethylhexanol and in particular from n-butanol. 2-Ethylhexyl acrylate and very particularly n-butyl acrylate are preferred. Mixtures of different alkyl acrylates which differ in their alkyl radical may also be used.

The alkyl acrylates are preferably crosslinked, for which purpose a polyfunctional, crosslinking monomer is present in amounts of up to 10% by weight, based on the monomers M. Crosslinking monomers are bi- or polyfunctional comonomers having at least two olefinic, nonconjugated double bonds, for example butadiene and isoprene, divinyl esters of dicarboxylic acids, such as those of succinic acid and adipic acid, diallyl and divinyl ethers of bifunctional alcohols, such as those of ethylene glycol and of butane-1,4-diol, diesters of acrylic acid and methacrylic acid with the stated bifunctional alcohols, 1,4-divinylbenzene and triallyl cyanurate. The acrylates of tricyclodecenyl alcohol of the following formula

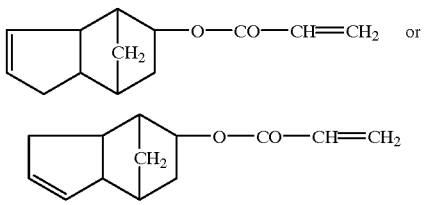

which is known under the name dihydrodicyclopentadienyl acrylate, and the allyl esters of acrylic acid and of methacrylic acid are particularly preferred.

A particularly suitable alkyl methacrylate is methyl methacrylate.

M2) conjugated dienes, such as butadiene, isoprene and chloroprene, as well as norbornene and dicyclopentadiene.

M3) vinyl aromatic monomers, such as styrene and styrene derivatives of the general formula

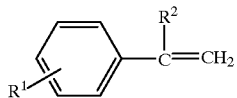

where $R^1$ and $R^2$ are each hydrogen or $C_1$–$C_8$-alkyl.

M4) acrylonitrile and methacrylonitrile.

M5) the glycidyl esters glycidyl acrylate and methacrylate.

M6) N-substituted maleinimides such as N-methyl-, N-phenyl- and N-cyclohexylmaleinimide.

M7) acrylic acid, methacrylic acid, and dicarboxylic acids, such as maleic acid, fumaric acid and itaconic acid, and the anhydrides thereof, such as maleic anhydride.

M8) monomers having nitrogen functional groups, such as dimethylaminoethyl acrylate, diethylaminoethyl acrylate, vinylimidazole, vinylpyrrolidone, vinylcaprolactam, vinylcarbazole, vinylaniline, acrylamide and methacrylamide.

M9) aromatic and araliphatic esters of acrylic acid and methacrylic acid such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate.

M10) unsaturated ethers, such as vinyl methyl ether.

The monomers stated under M1) to M10) may be polymerized with one another alone or as a mixture.

The monomers M1) are preferably used. The amount of the monomers M1) in the monomer mixture is particularly preferably at least 50% by weight. Particularly preferably used monomers M1) are butyl acrylate and ethylhexyl acrylate and their crosslinking agents, as well as methyl methacrylate. Among the monomers M2), butadiene is preferred. Among the monomers M3) and M4), styrene and its substituted derivatives, such as α-methylstyrene, and acrylonitrile are preferred monomers.

The monomers to be used depend of course on the intended use of the polymer particles P which are formed from the monomers M. If soft, elastomeric particles are desired, the stated alkyl acrylates or dienes are preferably used as the major component of the monomer mixture. If hard particles are desired, styrene, acrylonitrile and/or methyl methacrylate are preferably used as major monomers.

In particular, the monomers M5) to M10) are preferably used as comonomers of the monomers M1) to M4), which comonomers vary within a certain range the mechanical properties and thermal properties of the polymer particles and of the molding materials which contain such particles.

Usually, the monomers M1) to M4) are present in a combined amount of from 50 to 100, preferably from 65 to 100, particularly preferably from 80 to 100, % by weight, based on the monomer mixture. The amount of the monomers M5) to M10) is therefore as a rule from 0 to 50, preferably from 0 to 35, particularly preferably from 0 to 20, % by weight, based on the monomer mixture.

If the particulate polymers P are to be used as dulling agents for thermoplastic molding materials, acidically or basically modified particles can be prepared, for example, by the concomitant use of monomers which contain acidic functional groups (for example the monomers M7)) or basic functional groups (for example the monomers M8)).

If these acidic or basic particles are present in a matrix of a thermoplastic polymer which is incompatible or partially compatible with the particles, the particles agglomerate owing to the incompatibility or partial compatibility to give relatively large agglomerates which emerge from the surface of the shaped article. The surface of the shaped article appears dull to the observer, owing to the diffuse light reflection at the microscopic irregularities.

Further details relating to the definition of the compatibility of polymers are given, for example, in German Patent Application DOS 4,443,886.

Two preferred monomer compositions C are shown below, the stated percentages being based on the total mass of monomers M.

C-1: from 90 to 99.9, preferably from 95 to 99.9, particularly preferably from 97 to 99, % by weight of n-butyl acrylate and from 0.1 to 10, preferably from 0.1 to 5, particularly preferably from 1 to 3, % by weight of dihydrodicyclopentadienyl acrylate.

C-2: as for C-1, some or all of the n-butyl acrylate being replaced by ethylhexyl acrylate.

Usually, the amount of water in which the monomers M and the protective colloids PC are dispersed is from 25 to 95, preferably from 40 to 85, particularly preferably from 45 to 75, % by weight, based on the sum of monomers, water and protective colloids.

The protective colloids PC suitable for stabilizing the emulsion are water-soluble polymers which coat the monomer droplets and the polymer particles formed therefrom and thus protect them from coagulation.

Suitable protective colloids PC are cellulose derivatives, such as carboxymethylcellulose and hydroxymethylcellulose, poly-N-vinylpyrrolidone, polyvinyl alcohol and polyethylene oxide, anionic polymers, such as polyacrylic acid and copolymers thereof and cationic polymers, such as poly-N-vinylimidazole. The amount of these protective colloids is preferably from 0.1 to 5% by weight, based on the total amount of the emulsion.

Protective colloids and processes for the preparation of protective colloids are known per se and are described, for example, in Encyclopedia of Polymer Science and Engineering, Vol. 16, p. 448, John Wiley Publishers 1989.

One or more polyvinyl alcohols are preferably used as the protective colloid, in particular those having a degree of hydrolysis of less than 96, particularly preferably from 60 to 94, very particularly preferably from 65 to 92, mol %. Preferred polyvinyl alcohols have a viscosity of from 2 to 100, in particular from 4 to 60, mPa.s, measured as a 4% strength by weight solution in water at 20° C. according to DIN 53015.

In addition to the protective colloids, colloidal silica may be present in a concentration of, as a rule, from 0.2 to 5% by weight, based on the amount of the dispersion. Further details relating to this method, which is particularly successful with a water-soluble polymer of adipic acid and diethanolamine as protective colloid, are given in U.S. Pat. No. 3,615,972.

In order to suppress the emulsion polymerization process which takes place simultaneously with the microsuspension polymerization and in which substantially smaller and therefore undesired particles are formed, a water-soluble inhibitor which suppresses the emulsion polymerization may be present. Effective compounds of this type are, for example, chromium(+6) compounds such as potassium dichromate.

An emulsion is prepared from the monomers M, water and the protective colloids PC by allowing high shear forces to act. Homogenizers which are known to a person skilled in the art are used for this purpose.

Examples are:

Dispermat laboratory dissolver, from VMA-Getzmann, Reichshof, Germany

Ultra-Turax, from Janke and Kunkel, Staufen, Germany

Pressure homogenizer, from Gaulin, Lubeck, Germany

Apparatuses having a rotor-stator system, for example
Dispax, from Janke and Kunkel, Staufen, Germany
Cavitron homogenizers, from v. Hagen & Funke, Sprochhövel, Germany
Homogenizers from Kotthoff, Essen, Germany
Homogenizers from Dorr Oliver, Grevenbroich, Germany.

Usually, these apparatuses operate at speeds of from 1000 to 25 000, preferably from 2000 to 25 000, rpm.

Furthermore, the high shear forces can also be generated by

The action of ultrasound,

Forcing the mixture of monomers, water and protective colloids under high pressure through a narrow slot or through nozzles of small diameter Colloid mills or other suitable homogenizers.

The emulsion is usually prepared at room temperature, but higher or lower temperatures may be useful depending on the type of monomers and protective colloids.

The emulsion can be prepared either batchwise or continuously. In the batchwise preparation, monomers, water and protective colloids are initially taken in a container and are mixed by means of the homogenizer to give a microsuspension (emulsion E).

The homogenizer may also be arranged parallel to the container, and the components are circulated through the homogenizer.

The homogenization time may be from 0.1 seconds to several hours, depending on, for example, the desired diameter of the monomer droplets and the size distribution to be established, or the mixing ratio of the monomers with water, or on the ratios of monomer, water and protective colloid and on the protective colloid used.

It is also possible initially to take the total amount of monomers and the total amount of water and to add the protective colloids when the homogenizer is started.

In a preferred embodiment of the continuous preparation of the emulsion, the monomers, water and protective colloids can be fed to the homogenizer, and the emulsion E prepared in this manner can be fed directly to the reactor in which the polymerization is carried out.

In another preferred embodiment of the continuous emulsion preparation, monomers, water and protective colloids are circulated through the homogenizer and only a part of the circulated mixture is removed and fed to the polymerization reactor. This circulation procedure is advisable in particular when the emulsification of the monomers is still insufficient after only a single pass through the homogenizer or when, for example, the droplet size is too large and/or the size distribution is too broad.

In a further preferred embodiment, the prepared emulsion E can be temporarily stored in a storage container before the polymerization and can be metered from the storage container into the polymerization reactor. This makes it possible to carry out the emulsification and polymerization spatially separated from one another, for example in different buildings in the case of large-scale industrial application of the process.

In a further embodiment, the preparation of the emulsion can also be carried out batchwise in a first step and continuously in a second step: the components are emulsified as a batch in the manner described, and the resulting emulsion is then subjected to a second emulsification carried out continuously. This results in the finished emulsion, which is fed continuously to the reactor.

Additives which impart certain properties to the particulate polymers P may be added before or during the preparation of the emulsion E. Examples of such additives are polymers, dyes and pigments and ferromagnetic pigments.

Particularly suitable polymers are those which are soluble in the monomers M or swell in the monomers M.

Suitable dyes and pigments are the dyes usually used for coloring polymers, for example organic colorants and carbon black, $TiO_2$, $CaCO_3$ and others. The use of carbon black results in the formation of black particulate polymers P which are used in particular as toners for copiers. Carbon black or other black dyes or pigments are preferred additives.

Ferromagnetic pigments are present as the coating on magnetic tapes (video, audio and other data storage cassettes) and magnetic films (computer diskettes). They are known to a person skilled in the art and are likewise preferred additives.

The additives may be added in dissolved form (in particular in the case of soluble dyes), swollen form (in particular in the case of polymers) or suspended form (in the case of pigments and ferromagnetic pigments).

The additives are generally distributed extremely uniformly in the resulting emulsion E by the homogenizer so that, after the polymerization, additives are as a rule contained uniformly in the particles.

The amount of the additives is as a rule at least 0.5, preferably at least 5, particularly preferably at least 10, % by weight, based on the mixture fed to the homogenizer.

The polymerization is initiated by means of free radical polymerization initiator RI. Such compounds are known to a person skilled in the art.

Preferred compounds are those which have a half-life of one hour when the temperature is from 60 to 110° C. and which are markedly soluble in the monomers.

In particular, organic peroxides, azo compounds and/or compounds having C—C single bonds are used as initiators RI. Monomers which polymerize spontaneously at elevated temperatures are also used as free radical polymerization initiators.

Mixtures of the stated initiators RI may also be used.

Preferred peroxides are those having hydrophobic properties, in particular those molecules having an atomic ratio of carbon to oxygen of greater than 3:1. Very particularly preferred are dilauryl peroxide and dibenzoyl peroxide, especially dilauryl peroxide.

Preferably used azo compounds are 2,2'-azobis(2-methylbutyronitrile) and 2,2'-azobis (isobutyronitrile). Preferably used compounds having labile C—C bonds are 3,4-dimethyl-3,4-diphenylhexane and 2,3-dimethyl-2,3-diphenylbutane.

Styrene and its derivatives, such as vinyltoluene, are used as monomers which polymerize spontaneously at elevated temperatures, styrene being particularly preferred.

The amount of initiator RI is usually from 0.05 to 4, preferably from 0.1 to 2, particularly preferably from 0.3 to 1, % by weight, based on the amount of the monomers M. These stated amounts are of course not applicable where the monomer is at the same time the initiator, as, for example, styrene.

Depending on the state of aggregation of the initiator and its solubility behavior, the initiator may be added as such but is preferably added as a solution or emulsion (liquid-in-liquid) or suspension (solid-in-liquid), with the result that in particular small amounts of initiator can be precisely metered.

Suitable solvents or liquid phases for the initiator are organic solvents, for example benzene, toluene, ethylbenzene and cyclohexane, in particular cyclohexane, and the monomers themselves. When the monomers themselves are used as solvents or liquid phase for the initiator, the initiator is dissolved or emulsified/suspended in the total amount of the monomers or preferably in a relatively small proportion of the monomers, and this proportion is then added to the remaining components.

It is also possible to dissolve the initiator in the solvent or in the monomer and to disperse the resulting solution in water.

The amount of solvent or liquid phase in which the initiator RI is dissolved, emulsified or suspended is preferably chosen so that the concentration of the initiator in the prepared solution or emulsion/suspension is at least 5, preferably at least 8, particularly preferably at least 10, % by weight.

The initiator or initiators RI may be added before or after the preparation of the emulsion E or may be subsequently metered in immediately before the beginning of the polymerization or continuously in the course of the polymerization.

Particularly in the case of monomers which tend to undergo uncontrolled polymerization or which polymerize at a temperature as low as the temperature at which the emulsion was prepared, it is advisable to add the initiator RI only after the emulsification, and in certain circumstances not until immediately before the polymerization.

Particularly in polymerizations with a long polymerization time, it may be advantageous to add the initiator as a continuous feed or in portions during the polymerization. The duration of the initiator feed may be different from or identical to the duration of the polymerization.

Buffer substances, such as $Na_2HPO_4/NaH_2PO_4$ or sodium citrate/citric acid may be used as further additives in the polymerization, in order to establish an essentially constant pH.

Furthermore, molecular weight regulators, for example mercaptans, such as tert-dodecylmercaptan, or ethylhexyl thioglycolate, may be present.

These further additives may be introduced continuously or batchwise at the beginning and/or during the preparation of the emulsion and/or during the polymerization.

In the novel process, the emulsion E is polymerized completely or partially by the feed method.

According to the invention, not more than 75% by weight (initially taken portion of E), based on the emulsion E, of the emulsion E are initially taken in the reactor at the beginning of the polymerization, and at least 25% by weight (feed portion of E), based on the emulsion E, of the emulsion E are fed to the reactor only after the beginning of the polymerization.

Preferably, the initially taken portion of E is not more than 50% by weight and the feed portion of E is at least 50% by weight, based in each case on E. Particularly preferably, the initially taken portion of E is not more than 35% by weight and the feed portion of E is at least 65% by weight, based in each case on E. Very particularly preferably, the initially taken portion of E is not more than 20% by weight and the feed portion of E is at least 80% by weight, based in each case on E.

In a preferred embodiment, the time span in which the feed portion of E is fed to the reactor (feed time) is at least 10, preferably at least 20, particularly preferably at least 30, very particularly preferably at least 60, minutes.

The polymerization is carried out in the usual manner, for example by heating the reactor content, with the result that the polymerization reaction is initiated. If required, it is also possible for the initiator RI not to be added until this point, ie. to the heated emulsion. The polymerization temperature depends, inter alia, on the monomers and initiators used and on the desired degree of crosslinking of the particulate polymers P formed. In general, polymerization is carried out at from 30 to 120° C., it also being possible to establish different temperatures in succession or a temperature gradient.

The polymerization reaction is carried out as a rule with slow or moderate stirring, during which (in contrast to the preceding emulsification by means of high shear forces) the droplets are not further divided.

In a preferred embodiment, the polymerization of the monomer droplets, containing the monomers M is completed without addition of further monomers M* differing from the monomers M. In this case, particulate polymers P which are essentially homogeneous (uniform distribution of the monomer building blocks in the particle) are obtained.

In another preferred embodiment, the polymerization of the monomers M is carried out to a conversion of at least 25%, based on the monomers M used, after which one or more further monomers M* are added and polymerized. This gives particulate polymers P having a core-shell morphology, the core containing the polymerized monomers M and the shell containing the polymerized monomers M*.

As a rule, but not necessarily, the polymerization of the further monomers M* onto the core constitutes a grafting reaction as is familiar to a person skilled in the art. In this case, the core-shell particles formed are graft particles.

The polymerization of the monomers M is preferably carried out to a conversion of at least 65%, particularly preferably at least 80%, based in each case on the monomers M used, before the further monomers M* are added and polymerized.

If—according to one embodiment—the further monomers M* are added before the monomers M have been completely converted into the polymer core (conversion of M less than 100%), the monomers M still remaining and the added further monomers M* polymerize simultaneously. This gives core-shell polymers having a gradual transition from the core (comprising monomers M) to the shell (comprising monomers M*), ie. a tapered transition.

If—according to another embodiment—the further monomers M* are not added and polymerized until after complete conversion of the monomers M, particles having a well defined transition from core to shell are obtained.

In one embodiment, the further monomers M* are added batchwise as a single feed or a plurality of feeds, and in another embodiment they are added as a continuous feed.

In a further embodiment, the further monomers M* may be added to the reactor in succession in a plurality of stages of the polymerization, where the monomers M* of each stage differ from one another. Core-shell particles having a plurality of shells are obtained in this manner.

The monomers M* of a polymerization stage are polymerized to a conversion of at least 25%, preferably at least 65%, particularly preferably at least 80%, based on the monomers M* used in the respective stage, before monomers M* are again added in the next polymerization stage.

As described above, the transition between the individual shells of the resulting core-shell particle is all the more well defined the more complete the conversion of the monomers M* before the monomers M* of the next stage are added.

Regarding the polymerization conditions (temperature, additives), reference may be made to the statements relating to the polymerization of the monomers M, which are also applicable in content to the reaction of the monomers M*.

In particular, it may be useful to add further protective colloids PC batchwise or continuously before and/or during the polymerization of the monomers M*, and the protective colloids may differ from those used for the preparation of the core. However, the polyvinyl alcohols described are preferably used again.

It may also be useful to add further free radical polymerization initiators RI batchwise or continuously before and/or during polymerization of the monomers M*, and the initiators may be identical or different from those used for the preparation of the core.

Further monomers M* of each stage may be added batchwise (all at once) or continuously (as a feed).

Suitable monomers M* are all monomers which were mentioned for the monomers M, preferably the monomers M1) to M9) mentioned. The monomers M* differ as a rule from the monomers M. If, for example monomers M which give an elastomeric, soft polymer are used, monomers M* used are those which give a hard polymer. Thus, a particulate polymer P having a soft core and a hard shell is obtained. Such polymers are preferred.

Preferred further monomers M* are styrene, α-methylstyrene, acrylonitrile, methacrylonitrile, methyl methacrylate and mixtures thereof. Polymers P comprising a core of crosslinked polybutyl acrylate and a shell of polystyrene or polystyrene/acrylonitrile or polymethyl methacrylate may be mentioned by way of example.

Other preferred monomers M* are those having acidic and/or basic groups, as mentioned as M6) and M7) for the monomers M. If monomers functionalized in this manner are incorporated as polymerized units in the shell(s), particulate polymers are formed which agglomerate in an incompatible or partially compatible matrix, leading to the dulling effect described.

Some preferred monomer compositions C* are described below for the monomers M*, the stated percentages being based on the total mass of the further monomers M*.

C*-1: from 50 to 99, preferably from 60 to 95 and particularly preferably from 65 to 95, % by weight of styrene and from 1 to 50, preferably from 5 to 40 and particularly preferably from 5 to 35, % by weight of acrylonitrile C*-2: 100% by weight of styrene C*-3: 100% by weight of PMMA It is also possible to prepare particulate polymers having a hard core and a soft shell by choosing the appropriate monomers as monomers M and as monomers M*.

In the same way, it is possible to obtain multi-shell polymers, for example having a morphology comprising hard core—soft shell—hard shell, if different monomers M* are added and polymerized in succession in a plurality of stages in the manner described.

For example, particles comprising a hard polystyrene core, a first shell of soft polybutyl acrylate and a second (outer) shell of hard polystyrene/acrylonitrile is obtained by polymerization of styrene as monomer M, n-butyl acrylate (plus crosslinking agent) as first further monomer M* and a styrene/acrylonitrile mixture as second further monomers M*.

Where the monomers M (for the core) do not differ in type from the monomers M* (for the shell(s)), the ratios of monomers M in the monomer mixture from which the core polymer is formed differ from the ratios of the monomers M* in the monomer mixture from which the shell polymer is formed.

For example, 80% by weight of n-butyl acrylate and 20% by weight of styrene may be used as monomers M and 80% by weight of styrene and 20% by weight of n-butyl acrylate as monomers M* giving a particle having a relatively soft core and relatively hard shell.

The diameter of the particulate polymers P is determined essentially by the diameter of the monomer droplets which are formed as a result of high shear force in the preparation of the emulsion E (and of course by shells polymerized on, if present).

The average particle diameter $d_{50}$ of the particulate polymers P is from 0.1 to 50 µm, preferably from 0.5 to 45 µm, particularly preferably from 0.5 to 30 µm.

The particle size can accordingly be controlled essentially by appropriately choosing and controlling the conditions during the polymerization of the emulsion E (for example, choice of homogenizer, duration of homogenization, ratios of monomers to water to protective colloids, emulsification procedure (single, multiple, batchwise or continuous, circulation procedure), homogenizer speed etc.).

The average particle size $d_{50}$ is the weight average. It is determined, for example, by preparing optical and electron micrographs and measuring and counting the particles with a section through the equator.

After the end of the polymerization, the particulate polymers P are present as a dispersion in water. Either this dispersion can be further processed as such or the polymers P can be separated off from the aqueous phase. This working up is carried out in a manner known per se, for example by sieving, filtration, decanting or centrifuging, and, if required, the polymer particles can be further dried in a conventional manner, for example by warm air or spray-drying or by means of a pneumatic dryer.

The particulate polymers P prepared using the novel process have a uniform product quality. Furthermore, compared with the batchwise polymerization procedure, the process is more economical and simpler to operate safely.

The particulate polymers P have a wide range of uses. Their use as dulling agents for thermoplastic molding materials, as toners for copiers, in particular, if they contain dyes and/or pigments, and as coatings for magnetic tapes and magnetic films, if they contain ferromagnetic pigments, may be mentioned merely by way of example.

The preparation of thermoplastic molding materials which contain the polymer P can be carried out by processes known per se, for example by incorporating the still moist or dried polymers P into the thermoplastic matrix at above the melting point of the matrix, in particular at from 150 to 350° C., in a conventional mixing apparatus, such as an extruder or kneader. It is also possible to incorporate the dispersion of the polymers P as such directly into the thermoplastics, the dispersion water being removed in a conventional manner, for example by steam via steam volatilization means, during the incorporation.

EXAMPLES

Demineralized water was used.

The polyvinyl alcohols used were products from Hoechst, Frankfurt/M., Germany, with the name Mowiol®. The first number after the trade name indicates the viscosity of a 4% strength by weight solution of polyvinyl alcohol in water at 20° C. in [mPa.s], measured according to DIN 53015; the second number indicates the degree of hydrolysis of the polyvinyl alcohol in mol %.

Example 1 a) Preparation of the core

A mixture of 39.2 g of n-butyl acrylate, 0.8 g of dihydrodicyclopentadienyl acrylate, 75.0 g of water, 8.0 g of a 10% by weight solution of the polyvinyl alcohol Mowiol® 8/88 in water and 0.2 g of dilauryl peroxide was initially taken in a container, and an emulsion was prepared using an immersed homogenizer of the type Dispermat CV (from VMA-Gelzmann), which was operated at a speed of 7000 rpm for 20 minutes. 10% by weight of this emulsion were initially taken in a nitrogen-flushed reactor, whose temperature was 75° C. and which was stirred with a paddle stirrer (300 rpm). The remaining 90% by weight of the emulsion were added dropwise in the course of one hour at the same temperature and stirrer speed. Polymerization was continued for a further hour.

b) Preparation of the shell 12.8 g of water and 4.8 g of a 10% strength by weight solution of polyvinyl alcohol as described under a)

were added to the mixture prepared under a). Thereafter, a mixture of 9.0 g of styrene and 3.0 g of acrylonitrile was added dropwise in the course of one hour at 75° C. and 300 rpm, and polymerization was continued for a further hour.

The reactor content was cooled, after which optical micrographs of said content were prepared. The average particle size $d_{50}$, determined by measuring and counting the particles with a section through the equator was 3 µm.

The amount of coagulated polymer particles was 3.4% by weight (moist), based on the total batch.

Example 2

The procedure was as described in Example 1, except that no dilauryl peroxide was initially taken but a solution of 0.2 g of dilauryl peroxide in 1.8 g of cyclohexane (10% strength by weight solution of dilauryl peroxide in cyclohexane) was added dropwise to the reactor during the polymerization of both the core and the shell.

The average particle size $d_{50}$ was 4 µm, and the amount of coagulated polymer particles was 3.8% by weight (moist), based on the total batch.

Example 3

4 Feeds were prepared:

5 Feed 1:

700.00 g of n-butyl acrylate 9.00 g of dihydrodicyclopentadienyl acrylate 2.67 g of butyl peroctoate, 75% strength by weight solution in isododecane 2.00 g of dilauryl peroxide Feed 2:

180.00 g of a 10% strength by weight solution of the polyvinyl alcohol Mowiol® 40/88 in water 1303.83 g of water Feed 3:

50.00 g of a 10% strength by weight solution of the polyvinyl alcohol as in feed 2

Feed 4:

225.00 g of styrene 75.00 g of acrylonitrile 5.00 g of ethylhexyl thioglycolate

Feeds 1 and 2 were passed through a homogenizer of the type Super Dispax SD41 (from Janke and Kunkel) and the emulsion was introduced into the reactor. The homogenizer was operated at a speed of 6000 rpm. The reactor was operated under nitrogen and stirred at 100 rpm.

a) Preparation of the core

First, 100 ml of feed 2 were introduced continuously into the reactor in the course of 5 minutes. 20% by weight of feed 1 and 20% by weight of feed 2 were then metered simultaneously into the reactor in the course of 10 minutes, after which the mixture was heated to 74° C. in the course of 15 minutes and polymerized for a further 15 minutes. The remaining 80% by weight each of feed 1 and of feed 2 were then metered into the reactor in the course of 40 minutes. Polymerization was continued for a further hour.

b) Preparation of the shell

The temperature was increased to 78° C. and feed 3 (without homogenizer) was added in the course of 5 minutes. Feed 4 was then added in the course of 2½ hours (without homogenizer). Polymerization was continued for a further hour.

After cooling, the particle size was determined in the manner described. The particles had a size of from 2 to 15 µm. The amount of coagulum was small (<1% by weight (moist), based on the total batch).

Example 4

The procedure was as in Example 3, except that feed 1 contained no tert-butyl peroctoate and no dilauryl peroxide. Instead, a solution of the peroxides in cyclohexane (feed 2a) was prepared.

Feed 2a 2.67 g of tert-butyl peroctoate, 75% strength by weight solution in isododecane 2.00 g of dilauryl peroxide 40.00 g of cyclohexane Feed 2a was fed to the reactor through the homogenizer in the same manner as feeds 1 and 2.

The particles had a size of from 2 to 15 µm. No coagulum was found.

Accordingly, particulate polymers P comprising a core of crosslinked polybutyl acrylate and a shell of polystyrene acrylonitrile were prepared.

The examples demonstrate the flexibility of the novel feed process: either the total amount of components for the core was emulsified before the polymerization (Examples 1 and 2) or the components for the core were emulsified continuously (Examples 3 and 4). The polymerization initiators were either concomitantly emulsified and initially taken (Examples 1 and 3) or added continuously during polymerization (Examples 2 and 4).

We claim:

1. A process for the preparation of a particulate polymer P having an average particle diameter $d_{50}$ of from 0.1 to 50 µm, in which an emulsion E prepared from one or more monomers M, and optionally one or more further monomer M* which are polymerizable by free radical polymerization to give the polymer P, water, and at least one protective colloid PC by the action of high shear forces, and the emulsion E is subjected to polymerization in a reactor with the use of a free radical polymerization initiator RI, wherein based on the emulsion E, not more than 35% by weight of the emulsion E are initially taken in the reactor at the beginning of the polymerization and at least 65% by weight of the emulsion E (feed portion of E) are not fed to the reactor until after the beginning of the polymerization, and wherein high speeds of from 1000 to 25,000 rpm, by the action of ultrasound, by forcing a mixture of monomers M, water and protective colloids PC under high pressure through a narrow slot or nozzles of small diameter, by colloid mills or by a combination of these high shear-force generating measures, are applied during the polymerization.

2. A process as claimed in claim 1, wherein the feed portion of E is fed to the reactor over a period of at least 10 minutes during the polymerization reaction.

3. A process as claimed in claim 1, wherein n-butyl weight of the monomers M comprise one or more $C_1$–$C_{12}$-alkyl esters of acrylic acid or methacrylic acid.

4. A process as claimed in claim 1, wherein n-butyl acrylate or ethylhexyl acrylate or mixtures thereof and one or more crosslinking, polyfunctional monomers are used as monomers M.

5. A process as claimed in claim 1, wherein the protective colloid PC contains one or more polyvinyl alcohols.

6. A process as claimed in claim 1, wherein polymers, dyes or pigments, ferromagnetic pigments or other additives in dissolved, swollen or suspended form are introduced as additives before or during the preparation of the emulsion E.

7. A process as claimed in claim 1, wherein the polymerization is carried out to a conversion of at least 25%, based on the monomers M used, after which one or more further monomers M* are added and polymerized, core-shell particles being formed.

8. A process as claimed in claim 1, wherein the further monomers M* are added in succession in a plurality of polymerization stages and, in each polymerization stage, the monomers M* are polymerized to a conversion of at least 25%, based on the monomers M* used in the respective stage, before monomers M* are again added in the next polymerization stage, core-shell particles having a plurality of shells being formed.

9. A process as claimed in claim 1, wherein styrene, α-methylstyrene, acrylonitrile, methacrylonitrile, methyl methacrylate or mixtures thereof are used as further monomers M*.

10. The process of claim 1 wherein the initially taken portion of emulsion E is not more than 20% and at least 80% by weight of the emulsion E is fed in after the beginning of polymerization in the initially taken portion.

11. The process of claim 2 wherein the feed time for the second portion is at least 20 minutes.

* * * * *

UNITED STATES PATENT AND TRADEMARK OFFICE
CERTIFICATE OF CORRECTION

PATENT NO. : 6,177,525 B1
DATED : January 23, 2001
INVENTOR(S) : McKee et al.

Page 1 of 1

It is certified that error appears in the above-identified patent and that said Letters Patent is hereby corrected as shown below:

Column 13, claim 1,
Line 9, after "E" insert -- is --.
Line 11, "M*" should be -- M, --.
Line 19, after "E" insert -- (initially taken portion of E) --.
Line 32, "n-butyl" should be -- at least 50% by weight --.

Signed and Sealed this

Twenty-third Day of October, 2001

Attest:

NICHOLAS P. GODICI
Attesting Officer
Acting Director of the United States Patent and Trademark Office